United States Patent [19]
Stancil et al.

[11] Patent Number: 5,559,968
[45] Date of Patent: Sep. 24, 1996

[54] NON-CONFORMING PCI BUS MASTER TIMING COMPENSATION CIRCUIT

[75] Inventors: Charles J. Stancil, Tomball; William M. Vaughn, Houston; Jeff W. Wolford, Spring, all of Tex.

[73] Assignee: Compaq Computer Corporation, Houston, Tex.

[21] Appl. No.: 398,382

[22] Filed: Mar. 3, 1995

[51] Int. Cl.⁶ ............................ G06F 13/00; G06F 1/14
[52] U.S. Cl. .......................................... 395/306; 395/550
[58] Field of Search .................................. 395/550, 306

[56]  References Cited

U.S. PATENT DOCUMENTS 4,631,702  12/1986  Korba .................................... 395/550

OTHER PUBLICATIONS

Am79C970 Pcnet™–PCI Single–Chip Ethernet Controller for PCI Local Bus, Publication #18220 Issue Date: Jun. 1994.
PCI Local Bus Specification–Production Version–Revision 2.0 Apr. 30, 1993.
Peripheral Component Interconnect (PCI) Add–in Board/Connector Addendum Feb. 26, 1993 (Final Draft).
PCI Local Bus–PCI to PCI Bridge Architecture Specification–Revision 1.0 Apr. 5, 1994.
PCI Local Bus–PCI System Design Guide–Revision 1.0 Sep. 8, 1993.
PCI Local Bus–PCI Compliance Checklist–Revision 2.0b Oct. 1994.
PCI Local Bus–PCI Bios Specification–Revision 2.1 Aug. 26, 1994.
PCI Mobile Design Guide–Oct. 27, 1994 Revision 1.0.

*Primary Examiner*—Jack B. Harvey
*Assistant Examiner*—Sumati Lefkowitz
*Attorney, Agent, or Firm*—Pravel, Hewitt, Kimball & Krieger

[57]  ABSTRACT

A circuit for preventing a non-conforming PCI bus master from performing cycles where the address driven is not provided soon enough for receiving circuitry to latch the address. The circuit modifies the bus grant signal to force the non-conforming PCI bus master to temporarily release the bus instead of performing a second data transfer cycle within the same bus access so that a conforming cycle is subsequently performed when the bus is reacquired by the non-conforming PCI bus master. The circuit forces the non-conforming PCI bus master off the bus even though the non-conforming PCI bus requests the bus and an arbiter has granted the bus to the non-conforming PCI bus master.

4 Claims, 5 Drawing Sheets

NON-CONFORMING PCI BUS MASTER TIMING COMPENSATION CIRCUIT

FIELD OF THE INVENTION

This invention relates to a Peripheral Component Interconnect (PCI) bus timing circuit, and more particularly to a circuit for compensating for timing deficiencies in PCI masters.

BACKGROUND OF THE INVENTION

The International Business Machines (IBM) Personal Computers (PCs), and compatibles, have been widely popular largely because of their ability to expand functionality through an expansion bus. The first expansion bus, known as the Industry Standard Architecture (ISA) bus, operates at a maximum bus speed of 8.33 MHz and has a 16-bit data bus.

As computers became more powerful, the ISA bus was identified as a major bottleneck. The bus was too slow to keep up with the advances of high-powered microprocessors. Additionally, the width of the ISA bus was narrower than that supported by the microprocessor, thus further slowing down data transfers between the microprocessor and the bus peripherals. So alternative solutions were sought after.

One such solution was the Extended Industry Standard Architecture (EISA) bus. The EISA bus provided a 32-bit data path, burst data transfers and high speed DMA transfers. Since the EISA bus was actually an extension of the ISA bus, backward compatibility with the ISA bus was maintained.

A competing solution, known as the Micro-Channel Architecture (MCA), was offered by IBM. It also featured a 32-bit data path, burst data transfers and high speed DMA transfers. However, the IBM solution did not maintain backward compatibility with older ISA boards.

As the microprocessors evolved and grew more powerful, graphical operating systems, such as Microsoft Windows, OS/2 and UNIX also grew in popularity. The graphics required by the operating systems placed great demands on the video graphics hardware. The speed at which data could be transferred from main memory to graphics memory was a primary concern. To address this concern, many computer manufacturers began to place the graphics subsystem directly on the microprocessor bus. Thus, a de facto bus had evolved based on the microprocessor bus interface. Eventually, the bus became known as the VL-Bus. To a great extent, this solved the speed problem, but created another. Because manufacturers of video graphics boards, network interface boards, memory boards, etc., all wanted the greatest performance, they all desired a direct connection to the microprocessor. But as the load increased on the microprocessor outputs, system reliability was placed in jeopardy. Additionally, the VL-bus was inherently tied to a certain microprocessor interface. So the VL-bus only provided a limited solution.

Recognizing this concern, a mezzanine bus was adopted by the computer industry. This bus, known as the Peripheral Component Interconnect (PCI) bus, was designed to provide a supplemental, high speed, microprocessor independent bus. The bus was not intended to replace the general purpose ISA, EISA or microchannel expansion buses. The PCI bus is defined in the Peripheral Component Interconnect Specification, versions 1.0 and 2.0, available from the PCI Special Interest Group in care of Intel Corp. which are herein incorporated by reference. Currently the PCI bus operates with a 32-bit or optional 64-bit data bus at a 33 MHz clock speed. In the specification, basic signals and transactions are defined so that all devices conforming to the PCI bus will be able to communicate with one another.

One such device not conforming fully to PCI standards is the AMD 79C970 Ethernet controller. The 79C970 is a single chip network controller which suffers from non-conforming address timing. When the device is a bus master, the clock to address valid timing of the device does not allow enough time for propagation delay and address setup before the next clock edge. Thus, a device receiving an address from the 79C970 may not latch the proper address. As the 79C970 provides a highly integrated, high performance network controller subsystem, it is desirable to use the device without redesigning the 79C970 or the PCI bus.

SUMMARY OF THE PRESENT INVENTION

According to the present invention, a circuit conditions a bus grant signal for a non-conforming PCI bus master to prevent the non-conforming device from performing non-conforming PCI bus cycles.

The non-conforming PCI bus master receives a modified bus grant signal to indicate bus ownership. On a first data transfer cycle, the non-conforming bus master drives the address one clock before asserting a beginning of cycle indication signal (FRAME_). On subsequent data transfer cycles, the non-conforming bus master drives the address simultaneously with the FRAME_ signal. In the subsequent data transfer cycles, the address is not received in time by the receiving device, thus the address is unreliable.

According to the present invention, by deasserting the modified bus grant signal to the non-conforming bus master before subsequent data transfer cycles are performed, only cycles exhibiting timing as in the first data transfer cycle will be performed.

In the preferred embodiment, a bus grant deassertion circuit receives the bus grant signal and provides a modified bus grant signal to the non-conforming bus master. After the first data transfer cycle, even though the non-conforming bus master continues to request the PCI bus and an arbiter has granted the non-conforming bus master access, the modified bus grant signal is temporarily deasserted. This causes the non-conforming bus master to relinquish the bus. After a single clock cycle the modified bus grant signal is asserted again. The non-conforming bus master reacquires the bus and performs a "second or subsequent" data transaction. However, since the non-conforming bus master has reacquired the bus, the timing conforms to the first data transfer cycle, wherein the address is provided before the FRAME_ signal. Thus, subsequent cycles are made to exhibit proper PCI timing. The modified bus grant signal is only provided to the non-conforming bus master. The PCI bus is not rearbitrated so the bus master appears to the PCI bus arbiter and other devices for the entire period. Only the non-conforming bus master receives the modified bus grant signal to cause only properly timed cycles to be provided.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
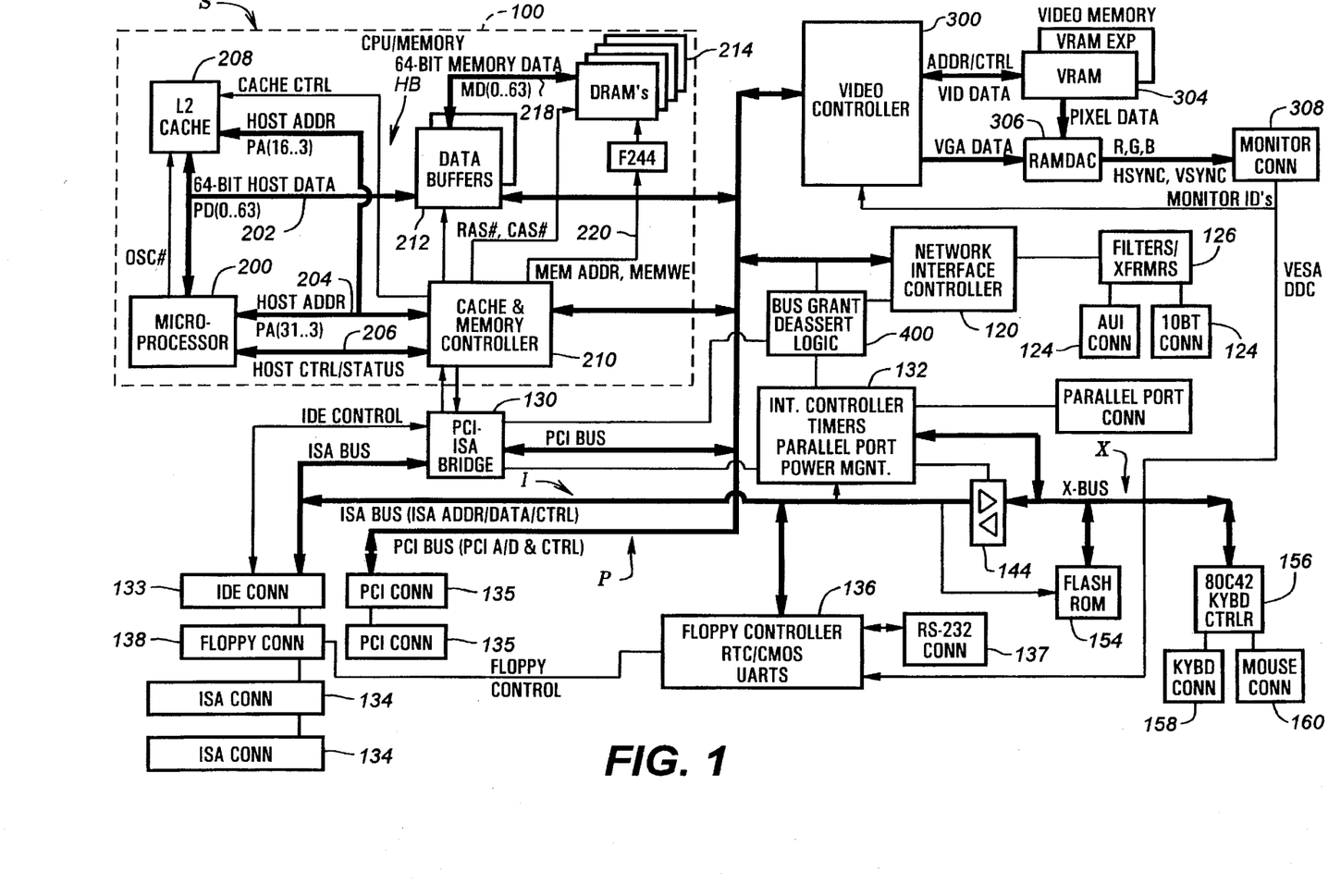
FIG. 1 is a block diagram of a computer system according to the present invention.

Referring now to FIG. 1, a computer system S according to the present invention is shown. In the preferred embodiment, the system board contains circuitry and slots for receiving interchangeable circuit boards. In the preferred embodiment, there are two primary buses located in the system S. The first bus is the PCI or Peripheral Component Interconnect bus P which includes an address/data portion and control signal portion. The second primary bus in the system S is the ISA bus I. The ISA bus I includes an address portion, a data portion and a control signal portion. The PCI and ISA buses P and I form the backbones of the system S.

A CPU/memory subsystem 100 is connected to the PCI bus P. The processor 200 is preferably the Pentium processor from Intel, preferably operating at 66 MHz, but could be an 80486 from Intel or processors compatible with the 80486 or Pentium or other processors if desired. The processor 200 provides data, address and control portions 202, 204, 206 to form a host bus HB. A level 2 (L2) or external cache memory system 208 is connected to the host bus HB to provide additional caching capabilities to improve performance of the computer systems. The L2 cache 208 may be permanently installed or may be removable if desired. A cache and memory controller and PCI bridge chip 210, such as the 82434X chip from Intel Corporation or the chip described in patent application Ser. Nos. 08/324,016, entitled "SINGLE BANK, MULTIPLE WAY CACHE MEMORY" and 08/324,246, entitled "MEMORY CONTROLLER WITH WRITE POSTING QUEUES FOR PROCESSOR AND I/O BUS OPERATIONS AND ORDERING LOGIC FOR CONTROLLING THE QUEUES", filed Oct. 14, 1994 and hereby incorporated by reference, is connected to the control portion 206 and to the address portion 204. The bridge chip 210 is connected to the L2 cache 208 as it incorporates the cache controller and therefore controls the operation of the cache memory devices in the L2 cache 208. The bridge chip 210 is also connected to control a series of data buffers 212. The data buffers 212 are preferably similar to the 82433LX from Intel, or those described in patent application Ser. Nos. 08/324,246 as incorporated above and 08/323,263, entitled "DATA ERROR DETECTION AND CORRECTION SYSTEM", filed Oct. 14, 1994 and hereby incorporated by reference, and are utilized to handle memory data to a main memory array 214. The data buffers 212 are connected to the processor data portion 202 and receive control signals from the bridge chip 210. The data buffers 212 are also connected to the PCI bus P for data transfer over that bus. The data buffers 212 provide a memory data bus 218 to the memory array 214, while a memory address and memory control signal bus 220 is provided from the bridge chip 210.

A video controller 300 is connected to the PCI bus P. Video memory 304 is used to store the graphics data and is connected to the video graphics controller 300 and a digital/analog converter (RAMDAC) 306. The video graphics controller 300 controls the operation of the video memory 304, allowing data to be written and retrieved as required. A video connector 308 is connected to the RAMDAC 306. A monitor (not shown) is connected to the video connector 308.

A network interface (NIC) controller 120 is connected to the PCI bus P. Preferably the controller 120 is a single integrated circuit and includes the capabilities necessary to act as a PCI bus master and slave and the circuitry to act as an Ethernet interface. Alternate Ethernet connectors 124 are provided on the system S and are connected to filter and transformer circuitry 126, which in turn is connected to the controller 120. This forms a network or Ethernet connection for connecting the system boards and computer to a local area network (LAN).

A PCI-ISA bridge 130 is provided to convert signals between the PCI bus P and the ISA bus I. The PCI-ISA bridge 130 includes the necessary address and data buffers and latches, arbitration and bus master control logic for the PCI bus, ISA arbitration circuitry, an ISA bus controller as conventionally used in ISA systems, an IDE (integrated drive electronics) interface, and a DMA controller. Preferably the PCI-ISA bridge 130 is a single integrated circuit, but other combinations are possible. The PCI bus arbitration can be performed many different ways. One way is disclosed in the description in the appropriate data book of the 82375 and 82378 from Intel Corp., while others are disclosed in Ser. No. 08/187,843, entitled "BUS MASTER ARBITRATION CIRCUITRY HAVING IMPROVED PRIORITIZATION" filed Jan. 28, 1994 and Ser. No. 08/398,366, entitled "BUS MASTER ARBITRATION CIRCUITRY HAVING MULTIPLE ARBITERS", filed concurrently herewith, both of which are hereby incorporated by reference.

A series of ISA slots 134 are connected to the ISA bus I to receive ISA adapter cards. A series of IDE slots 133 are connected to the ISA bus I and the PCI-ISA bridge chip 130 to receive various IDE devices, such as hard disk drives, tape drives and CD-ROM drives. A series of PCI slots 135 are connected to the PCI bus P to receive PCI adapter cards.

A combination I/O chip 136 is connected to the ISA bus I. The combination I/O chip 136 preferably includes a floppy disk controller, real time clock (RTC)CMOS memory, two UARTs, and various address decode logic. A floppy disk connector 138 for receiving a cable to a floppy disk drive is connected to the combination I/O chip 136 and the ISA bus I. Serial port connectors 137 are also connected to the combination I/O chip 136. A data buffer 144 is connected to the address data and control portions of the ISA bus I to provide an additional X bus X for various additional components of the computer system. A flash ROM 154 receives its control, data and address signals from the X bus X for data transfer. Preferably the flash ROM 154 contains the BIOS information for the computer system and can be reprogrammed to allow for revisions of the BIOS. An 8042 or keyboard controller 156 is connected to the X bus X. The keyboard controller 156 is of conventional design and is connected in turn to a keyboard connector 158 and a mouse or pointing device connector 160.

A miscellaneous system logic chip 132 is connected to the X bus X. The miscellaneous system logic chip 132 contains counters and timers as conventionally present in personal computer systems, an interrupt controller for both the PCI and ISA buses P and I, enhanced parallel port circuitry, power management logic and miscellaneous configuration registers, as well as other miscellaneous circuitry.

This is an exemplary computer system S and other variations could readily be developed by one skilled in the art.

In the nomenclature used to describe the present invention and in accordance with the PCI specification, a "transaction" refers to the exchange of data between PCI bus devices, categorically called "agents". A "master" is the agent requesting control of the bus for initiating a transaction. A "target" is the selected agent which completes the transaction. Each master has a separate bus access request and bus grant signal. Signal names ending with an underscore indicate negative logic, otherwise signals are assumed positive (high) when asserted.

In the preferred embodiment, the NIC 120 is mounted directly onto the system board, however, the NIC 120 could reside on PCI expansion boards and received into the PCI connectors 135, also known as PCI slots 0 and 1. It is also noted that the network interface controller is preferably an AMD 79C970 Ethernet controller, however, the techniques herein disclosed could work with the any PCI compatible device having address valid delays similar to the AMD device. Hereinafter, the on board NIC 120, alternate slot 0 and 1 embodiments, and other suitable devices are collectively referred to as non-conforming devices.

As mentioned in the background, when the 79C970 acts as a PCI bus master, the device fails to drive a valid address soon enough for receiving circuitry to latch the address on the next clock edge of the PCI clock. Specifically, when the device initiates a series of single cycle data transfers, during the first data transfer cycle the address is driven early enough to be valid, but on subsequent transfers within the same bus access period, the address is not driven soon enough.

Figure 4:
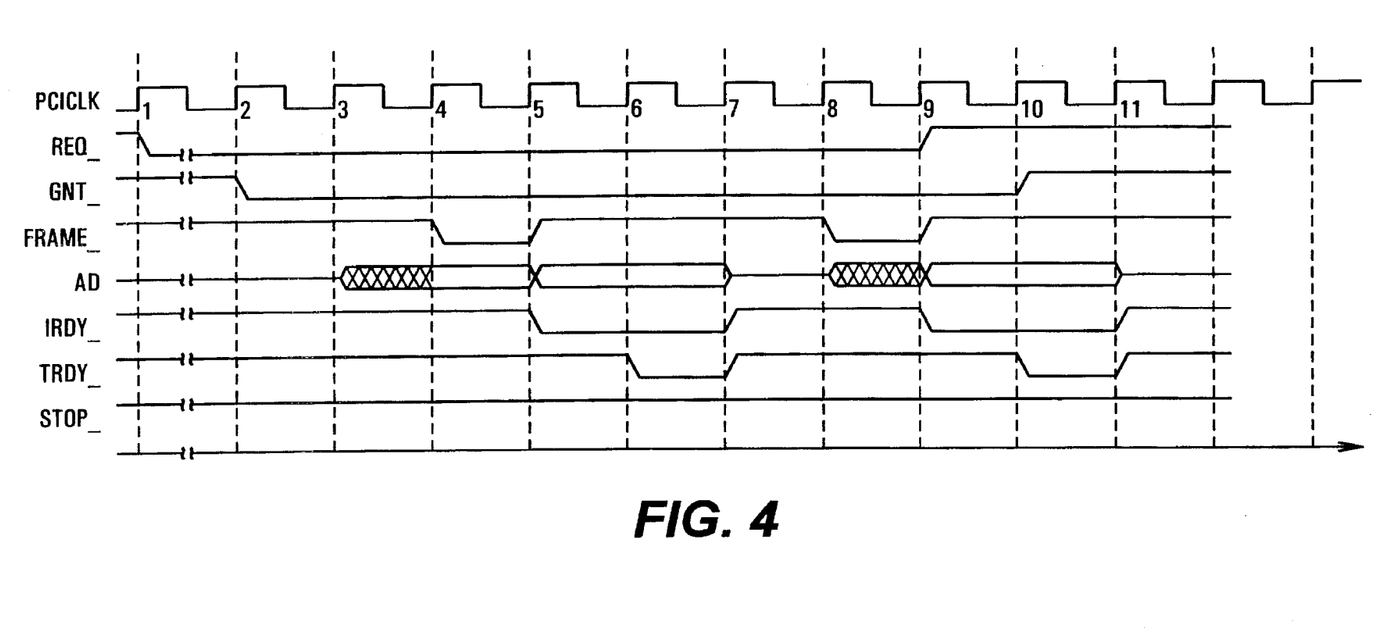
FIG. 4 is a timing diagram showing timing signals of the bus master without the benefit of the present invention.

FIG. 4 illustrates the timing problem. When the 79C970 desires access to the PCI bus P, the device drives its bus access request signal (REQ_). The bus grant signal (GNT_) is provided by the PCI bus arbitrator to allow access. At clock 3 the 79C970 recognizes the GNT_ signal and immediately drives an address on the PCI address/data bus (AD). According to PCI convention, the frame signal (FRAME_) is asserted during the address phase to indicate the beginning of an access, but the 79C970 delays assertion of the FRAME_ signal for one extra clock. The target recognizes the asserted FRAME_ signal and latches the address at clock 5. In this first data transfer, since address was provided early and prior to the FRAME_ signal, the address is valid at clock 5. The first data transfer cycle ends at clock 7. The initiator ready signal (IRDY_) indicates the initiating agent's (bus master) ability to complete the transaction, while the target ready signal (TRDY_) indicates the target agent's (selected device) ability to complete the transaction. A transaction is complete when both IRDY_ and TRDY_ are asserted.

At clock 8 the second data transfer begins when address and FRAME_ are asserted. At clock 9 the target again recognizes the asserted FRAME_ signal and attempts to latch the address, but in this instance, since the time from clock 8 to address valid is so long, an insufficient amount of setup time is provided for the target and the address is not guaranteed valid at clock 9. Thus, subsequent data transfers are unreliable.

Figure 2:
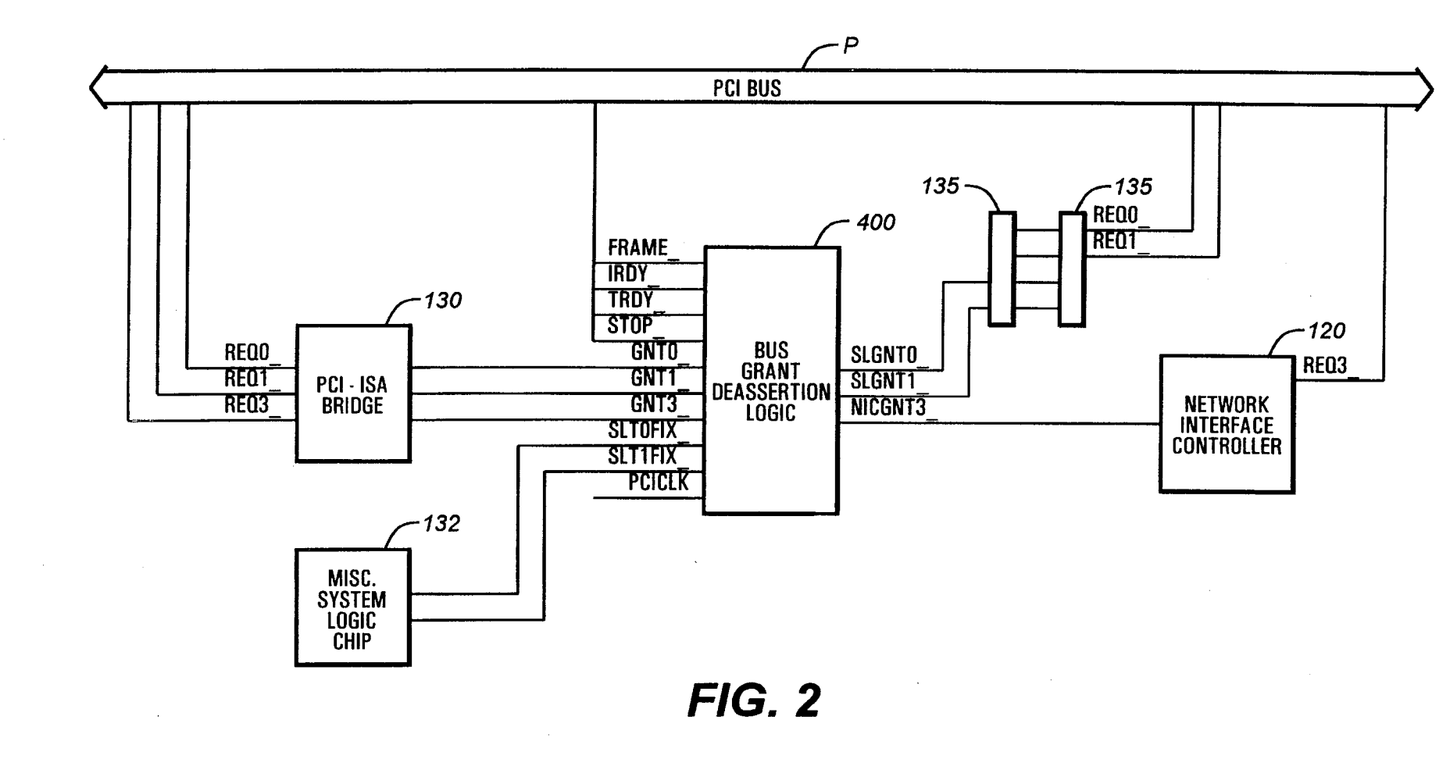
FIG. 2 is a block diagram of the network interface controller and the PCI bus arbitration logic of FIG. 1.

Referring now to FIG. 2, the network interface controller (NIC) 120 and supporting logic is shown in more detail. According to the present invention the NIC 120 is connected to the PCI bus P for receiving commands from the processor 200 and for transmitting data between the CPU/memory subsystem 100 and a local area network (not shown). Bus access request and bus grant signals are also transferred across the PCI bus P. The individual REQ0_, REQ1_ and REQ3_ signals are referred to as bus access request signals.

The GNT0_, GNT1_ and GNT3_ signals are referred to as bus grant signals, while the SLGNT0_, SLGNT1_ and NICGNT3_ signals are referred to as modified bus grant signals. Familiarity with the PCI bus is assumed herein.

The PCI-ISA bridge 130 also connects to the PCI bus P for receiving the bus access request signals. The arbitration logic in the PCI-ISA bridge 130 receives the bus access requests and provides bus grant signals. The bus grant deassertion logic 400 receives the bus grant signals and provides the modified bus grant signals to the non-conforming devices. According to the present invention, by modifying the bus grant signals, the timing deficiencies of the non-conforming devices can be corrected. In the preferred embodiment of the present invention, the bus grant signal is received by the bus grant deassertion logic 400, however, it is noted that the bus grant deassertion logic 400 could also be contained within the non-conforming device or be integrated into the PCI-ISA bridge 130.

The NIC 120 provides a bus access request signal (REQ3_) when a data transfer is desired. Similarly, non-conforming devices residing in slots 0 and 1 provide the bus access request signals REQ0_ and REQ1_ respectably. These signals are received by the PCI-ISA bridge 130 for providing the individual bus grant signals, GNT0_, GNT1_ or GNT3_ which correspond to the bus access request signals of the same number. The arbiter in the PCI-ISA bridge 130 is responsible for providing the bus grant signals at an appropriate time. According to PCI standards, only one bus grant signal may be granted at a time. Several variations of the arbiter are referenced above, but the relevant material here is that the grant is provided in response to a request and only one grant is provided at a time. The particularities of the arbitration scheme are not critical.

The miscellaneous system logic chip 132 provides enable signals and contains configuration registers which are initialized on power-up of the computer system S. If upon power-up, the computer system S determines that a non-conforming device resides on one of the PCI expansion slots, then a corresponding bit in a configuration register is set. Non-conforming devices can be determined by reading their device and vendor ID registers and comparing the values to a list of values corresponding to predetermined non-conforming devices. When the configuration bits are set, the corresponding enable signal is asserted. The slot 0 fix signal (SLT0FIX_) enables modification of the bus grant signal for slot 0, and the slot 1 fix signal (SLT1FIX_) enables modification for slot 1. If a non-conforming device does not reside in slot 0 or 1, the enable signals are not asserted. No enabling signal is provided for the NIC 120 as it is known to be a non-conforming device so that the feature should always be enabled.

The bus grant deassertion logic 400 receives the bus grant signals (GNT0_, GNT1_ and GNT3_), PCI bus signals (FRAME_, IRDY_, TRDY_ and STOP_), and SLT0FIX_ and SLT1FIX_ signals. A state machine internal to the bus grant deassertion logic 400 controls the conditioning of the received bus grant signals into modified bus grant signals, SLGNT0_, SLGNT1_ and NICGNT3_. The SLGNT0_ and SLGNT1_ signals indicate that the PCI bus P has been granted to the devices in slots 0 and 1 respectably, while the NICGNT3_ signal indicates that the NIC 120 has been granted access to the PCI bus P.

Figure 3:
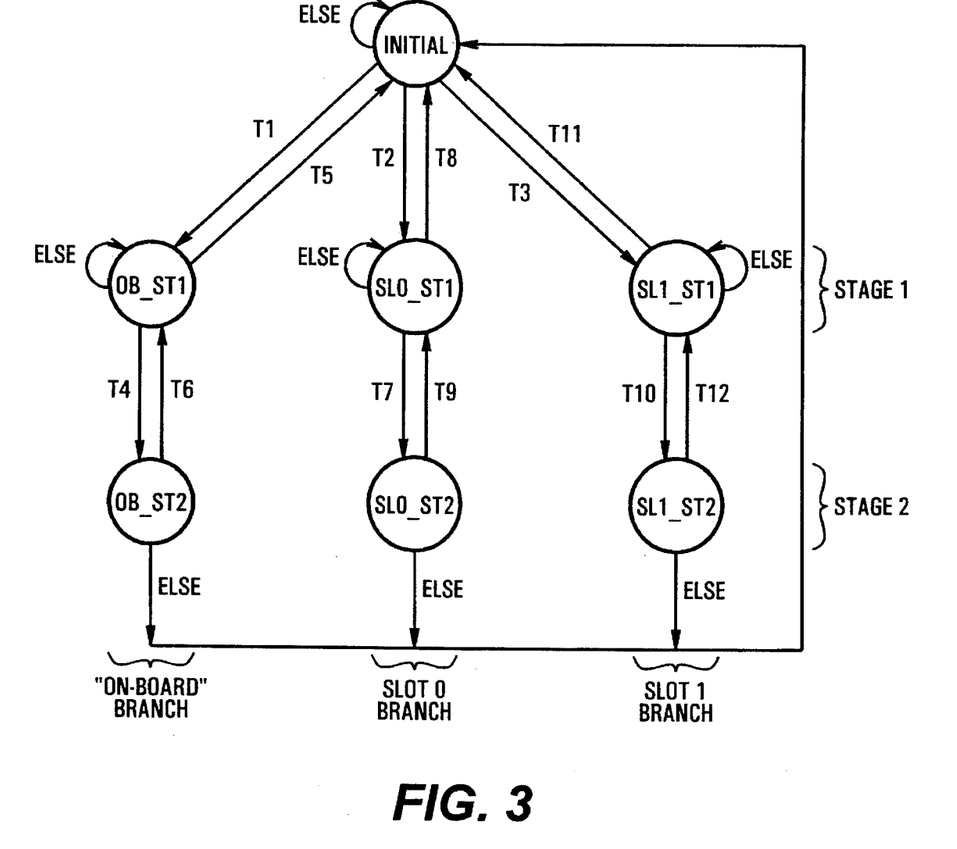
FIG. 3 is a state diagram of the bus grant deassertion logic of FIG. 2.

FIG. 3 is a state diagram the state machine of the bus grant deassertion logic 400. Transitions between states occur on the rising edge of the PCICLK signal.

Generally, while the state machine is at state INITIAL, if the bus grant signals for the non-compliant devices are not asserted, the state machine remains at state INITIAL. When a bus grant signal to a non-compliant device is detected and the PCI bus P is idle, the state machine will transition to stage 1 (states OB_ST1, SL0_ST1 or SL1_ST1) of one of the branches. The "on-board" branch refers to the preferred embodiment. The slot 1 and 0 branches refer to alternate embodiments in which the non-compliant agent resides on a PCI expansion board fitted into slot 0 or slot 1. When the data transaction is completed, the state machine transitions from stage 1 to stage 2 (states OB_ST2, SL0_ST2 or SL1_ST2). On the next clock, the state machine transitions either to stage 1 or back to state INITIAL. While the state machine is in stage 2, the modified bus grant signal (NICGNT3_, SLGNT0_ or SLGNT1_) is artificially deasserted to cause the non-compliant device to release the bus. Because the state machine only stays in stage 2 for one clock period, the modified bus grant signal is only deasserted for one clock period. After the modified bus grant signal is re-asserted, the non-compliant device re-acquires the PCI bus P to complete its transfer requests by performing a compliant PCI data transfer cycle. The other PCI agents on the PCI bus P, including the arbiter in PCI-ISA bridge 130, are unaware that the non-compliant device has temporarily released the bus. The state machine transition conditions are summarized in Table 1. The following description provides a more detailed explanation of the state machine and its corresponding events.

TABLE 1

| T1 | !GNT3_ & FRAME_ & IRDY_ |
|---|---|
| T2 | !GNT0_ & FRAME_ & IRDY_ |
| T3 | !GNT1_ & FRAME_ & IRDY_ |
| T4 | !TRDY_ # !STOP_ |
| T5 | GNT3_ & FRAME_ & IRDY_ |
| T6 | !FRAME_ # !IRDY_ |
| T7 | !TRDY_ # !STOP_ |
| T8 | GNT0_ & FRAME_ & IRDY_ |
| T9 | !FRAME_ # !IRDY_ |
| T10 | !TRDY_ # !STOP_ |
| T11 | GNT1 & FRAME_ & IRDY_ |
| T12 | !FRAME # !IRDY_ |

While the state machine is at state INITIAL, and if the bus grant signals (GNT0_, GNT1_ or GNT3_) are not asserted, the state machine remains at state INITIAL. If the state machine is at state INITIAL, the GNT3_ signal is asserted, and the FRAME_ and IRDY_ signals are deasserted, the state machine transitions to state OB_ST1, as shown at clock 3 of FIG. 5. If the state machine is at state INITIAL, the GNT0_ signal is asserted, and the FRAME_ and IRDY_ signals are deasserted, the state machine transitions to state SL0_ST1. If the state machine is at state INITIAL, the GNT1_ signal is asserted, and the FRAME_ and IRDY_ signals are deasserted, the state machine transitions to state SLI_ST1. Generally, the state machine transitions to and remains in state OB_ST1, SL0_ST1 or SL1_ST1 when a data transaction to the non-compliant device is occurring, but not yet completed.

While in state OB_ST1, SL0_ST1 or SL1_ST1, the state machine watches for an end of cycle indication to continue, otherwise the state machine transitions back to the INITIAL state if the bus is idle. First consider the on-board branch of the state machine.

If in state OB_ST1, and the GNT3_, FRAME_ and IRDY_ signals are deasserted, the state machine transitions back to the INITIAL state because the bus is idle. If in state OB_ST1, and the TRDY_ or STOP_ signal is asserted, the state machine transitions to state OB_ST2, as shown at clocks 7 and 12 of FIG. 5. The TRDY_ signal indicates the target agent's ability to complete the current data phase of the transaction. The STOP_ signal indicates the current target is requesting the master to stop the current data transaction and retry later, as shown at clock 11 of FIG. 5. The state machine remains in state OB_ST1 under all other conditions.

Figure 5:
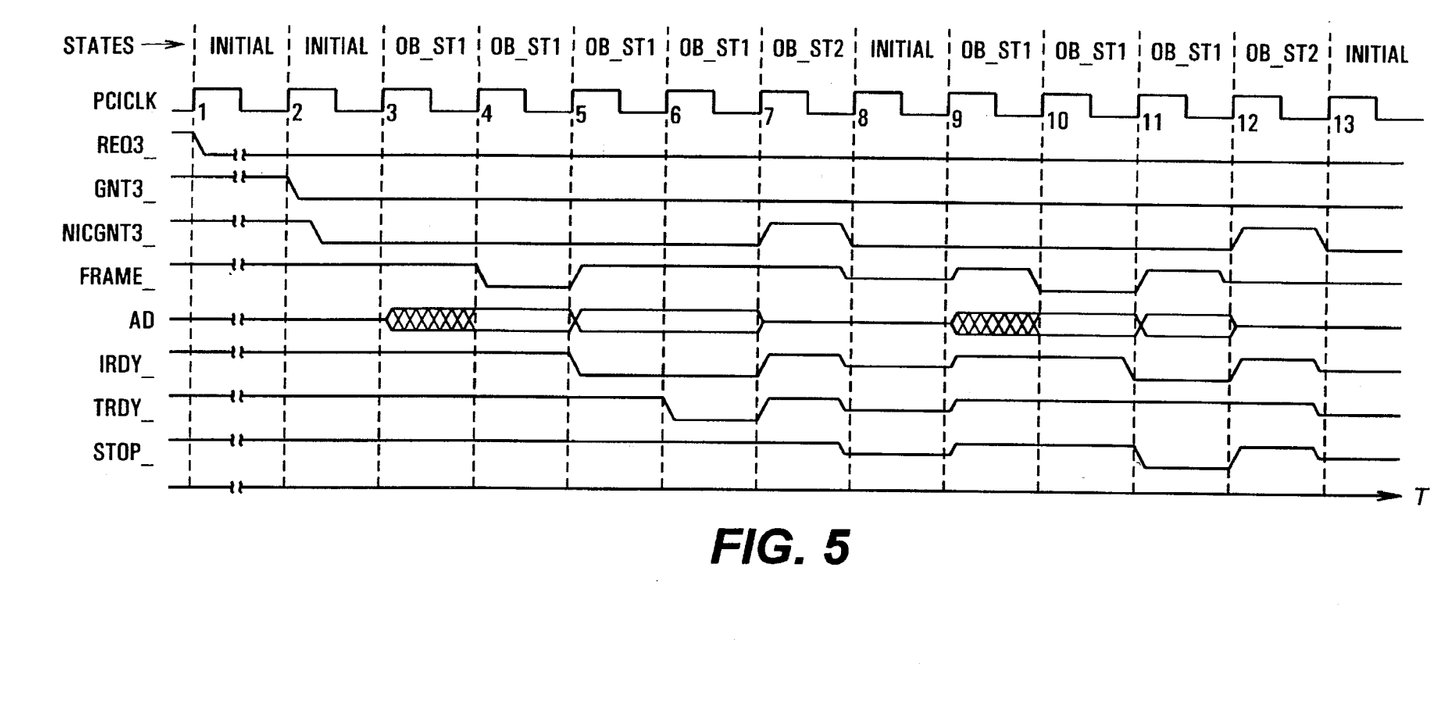
FIG. 5 is a timing diagram showing timing signals of the bus master and states of the state machine according to the present invention.

When the state machine is in state OB_ST2, the modified bus grant signal (NICGNT3_) is forced high (deasserted) to drive the non-compliant agent off the bus, as shown at clock 7 of FIG. 5. The modified bus grant signals are represented by the following equations.

NICGNT3_=GNT3_+(state_machine_state==OB_ST2)

SLGNT0_=GNT0_+(state_machine_state==SL0_ST2)

SLGNT1_=GNT1_+(state_machine_state==SL1_ST2)

Thus, the bus grant signals are passed on as the modified bus grant signals unless the state machine is in stage 2, in which case the modified bus grant signals are deasserted. When the deasserted modified grant signal is detected, at clock 8, the non-compliant agent subsequently responds by releasing the bus. If in state OB_ST2, and the FRAME_ or IRDY_ signal is asserted, the state machine transitions to state OB_ST1 for another data transaction, otherwise it transitions back to state INITIAL. Thus, the modified bus grant signal (NICGNT3_) is deasserted for one clock cycle. The bus request (REQ3_) and bus grant (GNT3_) signals are not affected. Therefore, even though the non-compliant device continues to request the bus and the arbitrator continues to grant the bus, the non-compliant device is not permitted to complete a second data transfer within the same bus access period. If further data transactions are required by the non-compliant agent, it keeps its bus request signal (REQ3_) asserted; and the PCI-ISA bridge 130, unless it decides to arbitrate the bus to another master, continues to provide the bus grant signal (GNT3_). When the modified bus grant signal (NICGNT3_) is re-asserted, at clock 8, by the bus grant deassertion logic 400, the non-compliant agent reacquires the PCI bus P and attempts another single data transaction with compliant PCI bus timing, as shown in clocks 9–13 of FIG. 5. The second consecutive data transfer with the shortened address timing, clocks 8–11 of FIG. 4, is avoided by forcing the NIC 120 off the PCI bus. Therefore, by conditioning the bus grant signal to the non-compliant PCI device, the device can be forced to act as a compliant PCI device without further changes to the PCI bus or changes to the non-compliant device itself.

The state machine process for slots 0 and 1 parallel the "on-board" branch. Next consider the branch for slot 0. If in state SL0_ST1, the GNT0_, FRAME_ and IRDY_ signals are deasserted, the state machine transitions back to the INITIAL state because the bus is idle. If in state SL0_ST1, and the TRDY_ or STOP_ signal is asserted, the state machine transitions to state SL0_ST2. Under all other conditions the state machine remains in state SL0_ST1.

When the state machine is in state SL0_ST2, the modified bus grant signal (SLGNT0_) is forced high (deasserted) to drive the non-compliant agent off the bus. The non-compliant agent subsequently responds by releasing the bus. If in state SL0_ST2, and the FRAME_ or IRDY_ signal is asserted, the state machine transitions to state SL0_ST1 for another data transaction, otherwise it transitions back to state INITIAL. Thus, the modified bus grant signal associated with slot 0 is deasserted for one clock cycle. The bus request and bus grant signals are not affected. If further data transactions are required by the non-compliant agent in slot 0, it keeps its bus request signal (REQ0_) asserted; and the PCI-ISA bridge 130, unless it decides to arbitrate the bus to another master, continues to provide the bus grant signal (GNT0_). Thus, when the modified bus grant signal is re-asserted, the non-compliant agent reacquires the bus and completes another single data transaction with compliant PCI bus timing.

Last consider the branch for slot 1. If in state SL1_ST1, the GNT1_, FRAME_ and IRDY_ signals are deasserted, the state machine transitions back to the INITIAL state because the bus is idle. If in state SL1_ST1, and the TRDY_ or STOP_ signal is asserted, the state machine transitions to state SL1_ST2. Under all other conditions the state machine remains in state SL1_ST1.

When the state machine is in state SL1_ST2, the modified bus grant signal (SLGNT1_) is forced high (deasserted) to drive the non-compliant agent off the bus. The non-compliant agent subsequently responds by releasing the bus. If in state SL1_ST2, and the FRAME_ or IRDY_ signal is asserted, the state machine transitions to state SL1_ST1 for another data transaction, otherwise it transitions back to state INITIAL. Thus, the modified bus grant signal associated with slot 1 is deasserted for one clock cycle. The bus request and bus grant signals are not affected. If further data transactions are required by the non-compliant agent in slot 1, it keeps its bus request signal (REQ1_) asserted; and the PCI-ISA bridge 130, unless it decides to arbitrate the bus to another master, continues to provide the bus grant signal (GNT1_). Thus, when the modified bus grant signal is re-asserted, the non-compliant agent reacquires the bus and completes another single data transaction with compliant PCI bus timing.

Therefore, by the act of transparently removing the grant from the non-compliant bus master, the bus master performs only compliant cycles. This allows all other portions of the PCI bus to remain unchanged.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system, comprising:

a Peripheral Component Interconnect (PCI) bus;

a PCI bus master device providing a bus request signal for accessing said PCI bus and an address, said PCI bus master receiving a bus grant signal when access is granted, said PCI bus master being capable of performing multiple single cycle bus transactions over said PCI bus;

a PCI bus target for receiving the address, wherein the address is received from said PCI bus master when a first single cycle bus transaction begins, and wherein the address is not received in time from said PCI bus master when a subsequent single cycle bus transaction begins;

a PCI bus arbiter for receiving said bus request signal and providing a bus grant signal when said PCI bus master is granted control of the PCI bus; and means receiving the bus grant signal and selectably providing a modified bus grant signal to said PCI bus master as said PCI bus master bus grant signal for causing said PCI bus master to release control of said PCI bus before the subsequent bus transaction begins and while the bus grant signal is asserted.

2. The computer system of claim 1, wherein said causing means passes on the bus grant signal as the modified bus grant signal when the bus grant signal is deasserted, and wherein said causing means further receives completion signals for indicating completion of a bus transaction and a stop signal for indicating stoppage of a bus transaction, and wherein said causing means passes on the bus grant signal as the modified bus grant signal when the bus grant signal is asserted except that said causing means temporarily deasserts the modified bus grant signal when the completion signals are received and when the stop signal is received.

3. The computer system of claim 2, wherein said PCI bus master is mounted on a system board.

4. The computer system of claim 1, further comprising:

a PCI expansion slot connected to said PCI bus; and means for providing an enable signal when said PCI bus master is mounted on a PCI expansion board and received in said PCI expansion slot, wherein said causing means passes on the bus grant signal as the modified bus grant signal when the bus grant signal is deasserted, and wherein said causing means further receives completion signals for indicating completion of a bus transaction, a stop signal for indicating stoppage of a bus transaction and the enable signal, and wherein said causing means passes on the bus grant signal as the modified bus grant signal when the bus grant signal is asserted except that said causing means temporarily deasserts the modified bus grant signal if the enable signal is received and when the completion signals are received and when the stop signal is received.

* * * * *